US005311430A

United States Patent [19]

Ishigami

[11] Patent Number: 5,311,430

[45] Date of Patent: May 10, 1994

[54] VEHICLE OPERATION DATA RECORDING APPARATUS

[75] Inventor: Kazuhiro Ishigami, Kanagawa, Japan

[73] Assignee: Nissan Motor Co., Ltd., Yokohama, Japan

[21] Appl. No.: 958,834

[22] Filed: Oct. 9, 1992

[30] Foreign Application Priority Data

Oct. 11, 1991 [JP] Japan ................................ 3-263862

[51] Int. Cl.[5] ................................ G06F 13/00

[52] U.S. Cl. ........................ 364/424.04; 364/424.03; 340/438

[58] Field of Search ..................... 364/424.01, 424.03, 364/424.04, 551.01; 340/438, 439; 360/5, 6

[56] References Cited

U.S. PATENT DOCUMENTS 4,817,118 3/1989 Wilburn et al. ................ 364/424.04
4,853,856 8/1989 Hanway ........................ 364/424.01
4,853,859 8/1989 Morita et al. .................. 364/424.03
4,939,652 7/1990 Steiner ........................ 364/424.03
4,987,541 1/1991 Levente et al. ................ 364/424.03
5,046,007 9/1991 McCrery et al. ............... 364/424.04
5,173,856 12/1992 Purnell et al. ................ 364/424.04
5,218,543 6/1993 Komatsu ...................... 364/424.04

OTHER PUBLICATIONS

Nissan Consult Operation Manual Engine 2, May 1992.

*Primary Examiner*—Gary Chin
*Attorney, Agent, or Firm*—Lowe, Price, LeBlanc & Becker

[57] ABSTRACT

An apparatus for use with an automotive vehicle having an internal combustion engine to record vehicle operation data. The apparatus is arranged to record the vehicle operation data when the vehicle stops before the engine stops.

20 Claims, 5 Drawing Sheets

VEHICLE OPERATION DATA RECORDING APPARATUS

BACKGROUND OF THE INVENTION

This invention relates to an apparatus for use with an automotive vehicle to record vehicle operation data.

In order to clear up the cause of a traffic accident, the vehicle operation data sampled around the time when the traffic accident occurs are required. However, it is difficult to detect the time when a traffic accident occurs. It may be considered to detect this time by monitoring the operation of a protective device such as an air bag. However, this cannot accommodate a slight traffic accident and will result in an expensive vehicle operation data recording apparatus.

SUMMARY OF THE INVENTION

It is a main object of the invention to provide an expensive vehicle operation data recording apparatus which can record the vehicle operation data sampled around the time when a traffic accident occurs.

There is provided, in accordance with the invention, an apparatus for use with an automotive vehicle having an ignition switch and an internal combustion engine to record vehicle operation data. The apparatus comprises first means for producing a command signal when the vehicle stops before the engine stops, and second means responsive to the command signal for recording the vehicle operation data.

In another aspect of the invention, there is provided an apparatus for use with an automotive vehicle having an ignition switch and an internal combustion engine to record vehicle operation data. The apparatus comprises first memory means having a memory area having a predetermined capacity for storing values of at least one vehicle operating condition, second memory means, and a control unit for reading existing values of the vehicle operating condition into the memory area of the first memory means at uniform intervals of time to produce engine operation data stored in the first memory means. The control unit includes first means for producing a command signal when the vehicle stops before the engine stops, and second means for transferring the vehicle operation data from the first memory means to the second memory means a predetermined time after the command signal is produced so that the transferred vehicle operation data include the vehicle operating condition values read for the predetermined time before the command signal is produced and the vehicle operating condition values read for the predetermined time after the command signal is produced.

In still another aspect of the invention, there is provided an apparatus for use with an automotive vehicle having an ignition switch and an internal combustion engine to record vehicle operation data. The apparatus comprises first memory means having a memory area having a predetermined capacity for storing values of at least one vehicle operating condition, second memory means having a predetermined number of memory areas each having a predetermined number of memory sections, and a control unit for reading existing values of the vehicle operating condition into the memory area of the first memory means at uniform intervals of time to produce engine operation data stored in the first memory means. The control unit including first means for producing a first command signal when the vehicle stops, second means for producing a second command signal when a predetermined time has elapsed after the first command signal is produced, third means for producing a third command signal when the engine stops, fourth means responsive to the third command signal for selecting one of the memory areas of the second memory means, fifth means responsive to the second command signal for selecting one of the memory sections of the selected one of the memory areas of the second memory means, and sixth means responsive to the second command signal for transferring the vehicle operation data from the first memory means to the selected one of the memory sections of the selected one of the memory areas of the second memory means so that the transferred vehicle operation data include the vehicle operating condition values read for the predetermined time before the first command signal is produced and the vehicle operating condition values read for the predetermined time after the first command signal is produced.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
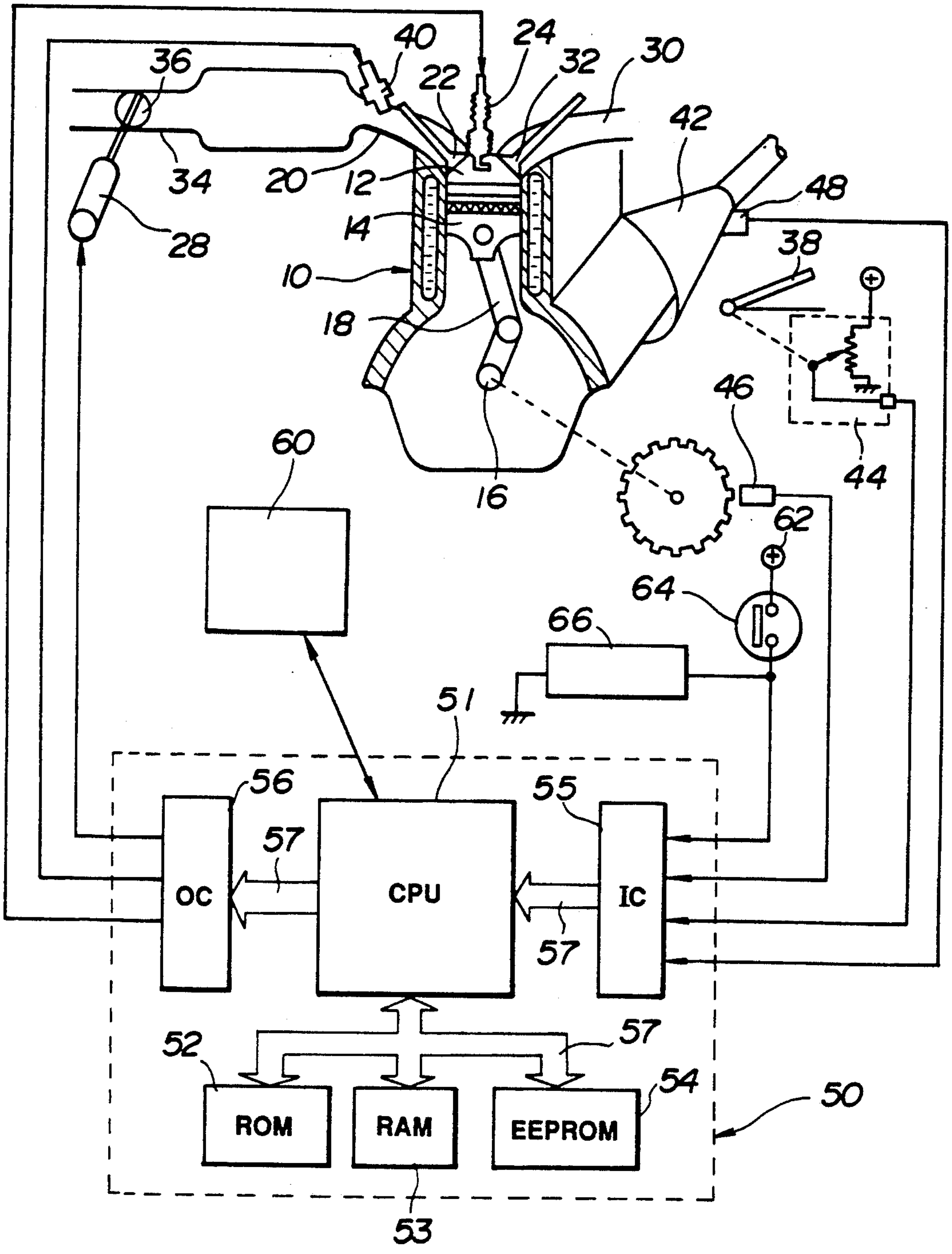
FIG. 1 is a schematic diagram showing one embodiment of a vehicle operation data recording apparatus made in accordance with the invention.

With reference to the drawings, and in particular to FIG. 1, there is shown a schematic diagram of an vehicle operation data recording apparatus embodying the invention. An internal combustion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10. Pivotally connected to the piston 14 and the crankshaft 16 is a connecting rod 18 used to produce rotation of the crankshaft 16 in response to reciprocation of the piston 14 within the cylinder 12.

An intake manifold 20 is connected with the cylinder 12 through an intake port with which an intake valve 22 is in cooperation for regulating an entry of combustion ingredients into the cylinder 12 from the intake manifold 20. A spark plug 24 is mounted in the top of the cylinder 12 for igniting the combustion ingredients within the cylinder 12 when the spark plug 24 is energized by the presence of high voltage electrical energy from an ignition coil (not shown). An exhaust manifold 30 is connected with the cylinder 12 through an exhaust port with which an exhaust valve 32 is in cooperation for regulating the exit of combustion products, exhaust gases, from the cylinder 12 into the exhaust manifold 30. The intake and exhaust valves 22 and 32 are driven through a suitable linkage with the crankshaft 16.

Air to the engine 10 is supplied through an air cleaner (not shown) into an induction passage 34. The amount of air permitted to enter the combustion chamber 12 through the intake manifold 20 is controlled by a butterfly throttle valve 36 situated within the induction passage 34. The degree of rotation of the throttle valve 36 is controlled according to the degree of depression of an accelerator pedal 38. For this purpose, the throttle valve 36 is connected through a mechanical linkage to a throttle actuator 28 which operates on command from a control unit 50 to be described later.

A fuel injector 40 is connected to a fuel supply system which includes the conventional parts of a fuel tank, a fuel pump, a fuel damper, a fuel filter and a pressure regulator, all of which are well known in the art. The fuel injector 40 opens to inject fuel into the intake manifold 20 when it is energized by the presence of electrical current. The length of the electrical pulse, that is, the pulse-width, applied to the fuel injecter 40 determines the length of time the fuel injecter 40 opens and, thus, determines the amount of fuel injected into the intake manifold 20. In the operation of the engine 10, fuel is injected through the fuel injector 40 toward the intake port of the cylinder 12 and mixes with the air therein. When the intake valve 22 opens, the air-fuel mixture enters the combustion chamber 12. An upward stroke of the piston 14 compresses the air-fuel mixture, which is then ignited by a spark produced by the spark plug 24 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve 32 opens and the exhaust gases are discharged into the exhaust manifold 30. The mechanical energy is transmitted through a transmission 42 to the road wheels (not shown).

Although the engine 10 as illustrated in FIG. 1 has only one combustion chamber 12 formed by a cylinder and piston, it should be understood that a four-cylinder engine has four cylinders, four intake valves, four exhaust valves, four reciprocating pistons, four fuel injectors and for spark plugs to ignite the air-fuel mixture within the combustion chambers and that a six-cylinder engine has six cylinders, six intake valves, six exhaust valves, six reciprocating pistons, six fuel injectors and six spark plugs.

The amount of fuel metered to the engine, this being determined by the width of the electrical pulses applied to the fuel injector 40, the fuel-injection timing, and the ignition-system spark timing are repetitively determined from calculations performed by a digital computer, these calculations being based upon various conditions of the engine that are sensed during its operation. These sensed conditions include accelerator pedal position, engine speed, vehicle speed, etc. thus, an accelerator pedal position sensor 44, an engine speed sensor 46 and a vehicle speed sensor 48 are connected to a control unit 50.

The accelerator pedal position sensor 44 includes a potentiometer connected between a voltage source and electrical ground. The resistance of the potentiometer is a function of the extent to which the accelerator pedal 38 is depressed. The wiper arm of the potentiometer is operatively connected to the accelerator pedal 38 to change the resistance value of the potentiometer as the accelerator pedal 38 moves between its fully released and depressed positions. The engine speed sensor 46 includes a crankshaft position sensor which produces a series of electrical pulses each corresponding to a predetermined number of degrees of rotation of the engine crankshaft 16. The vehicle speed sensor 48 includes a transmission output shaft position sensor which produces a series of electrical pulses each corresponds to a predetermined number of degrees of rotation of the output shaft of the transmission 42.

The control unit 50 comprises a digital computer which includes a central processing unit (CPU) 51, a random access memory (RAM) 52, a read only memory 53, a nonvolatile memory (EEPROM) 54, an input control unit (IC) 55 and an output control unit (0C) 56. The central processing unit 51 communicates with the rest of the computer via data bus 57. The input control circuit 55 includes a counter which counts the electrical pulses fed thereto from the engine speed sensor 46 and converts its count into an engine speed indication digital signal for application to the central processing unit 51. The input control circuit 55 includes a counter which counts the electrical pulses fed thereto from the vehicle speed sensor 48 and converts its count into a vehicle speed indication digital signal for application to the central processing unit 51. The input control circuit 55 also includes an analog-to-digital converter which receives an analog signal from the accelerator position sensor 44 and converts it into digital form for application to the central processing unit 51. The read only memory 52 contains the program for operating the central processing unit 61 and further contains appropriate data in look-up tables used in calculating appropriate values for fuel delivery requirements, ignition-system spark timing and throttle valve position. Control words specifying desired fuel delivery requirements, ignition-system spark timing, and throttle valve position are periodically transferred by the central processing unit 51 to the fuel-injection, spark-timing, throttle-valve-position control circuits included in the output control unit 56. The fuel-injection control circuit converts the received control word into a fuel injection pulse signal for application to a power transistor (not shown) which connects the fuel injector 40 to the vehicle battery 62 for a time period determined by the width of the fuel injection control pulse signal. The spark-timing control circuit converts the received control word into a spark timing control pulse signal for application to a power transistor (not shown) which connects the ignition coil to the vehicle battery 62 for a time period determined by the width of the spark timing control pulse signal. The throttle valve control circuit converts the received control word into analog form for controlling the direction and degree of motion of the throttle actuator so as to bring the throttle valve to the position calculated by the computer.

Figure 2:
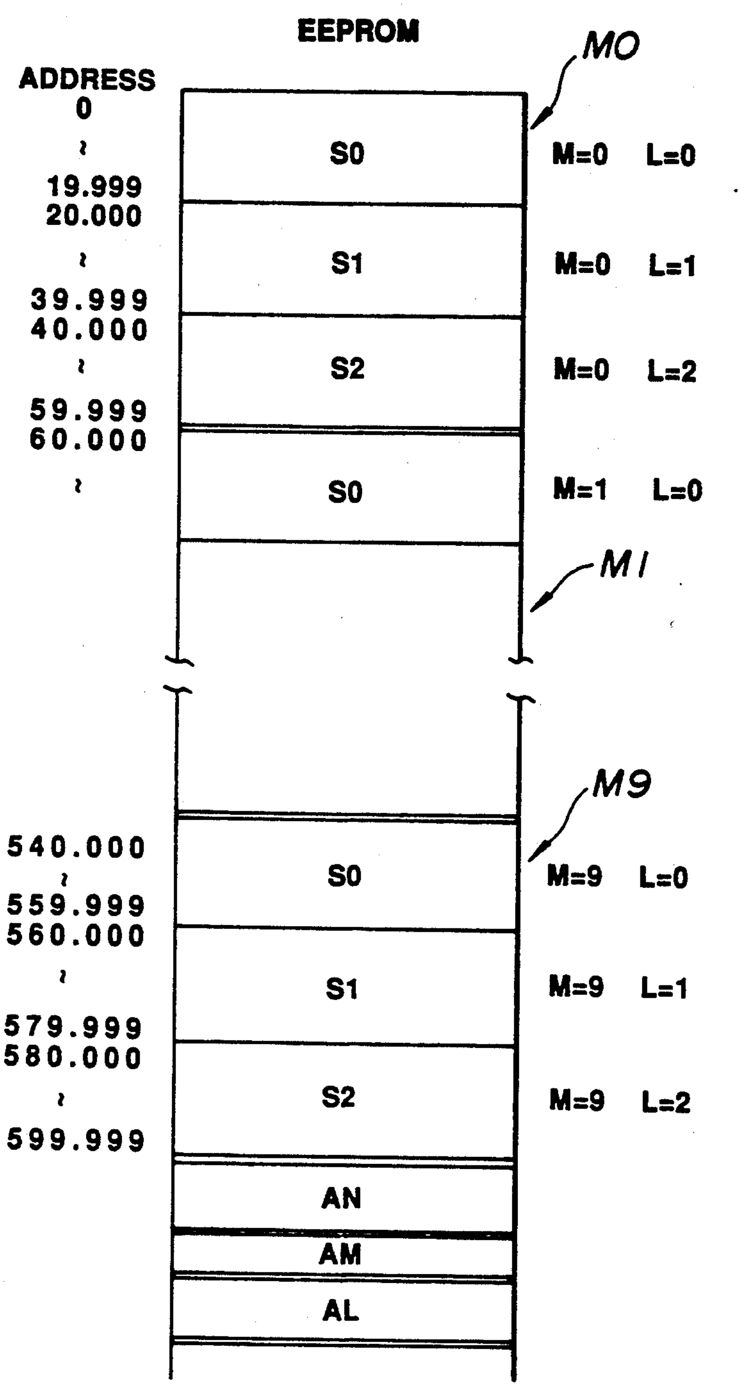
FIG. 2 is a diagram used in explaining the various memory areas specified in the nonvolatile memory (EEPROM) used in the vehicle operation data recording apparatus of FIG. 1.

The central processing unit 51 reads the existing values of selected vehicle operating conditions D1 to D10 (vehicle speed, engine speed, engine coolant temperature, accelerator pedal position, etc. ) into the random access memory 53 at uniform intervals of time. For example, the random access memory 53 has a memory domain or area having a predetermined capacity for storing values of the vehicle operating conditions. In the illustrated case, the random access memory 53 can store vehicle operation data including a number of sets of the values of the vehicle operating conditions D1 to D10 read, at uniform intervals of ten msec., for twenty seconds. The central processing unit 51 updates the oldest set of the values read in the random access memory 53 for the vehicle operating conditions D1 to D10 with the new set of the values of the vehicle operating conditions D1 to D10. The central processing unit 51 detects a vehicle stoppage, for example, when the vehicle speed $S_v$ is 0 km/h and reads a number of sets of the existing values of the vehicle operating conditions D1 to D10 into the random access memory 53, at uniform time intervals, for ten seconds after the vehicle stoppage is detected. After the lapse of the ten seconds, the central processing unit 51 transfers the vehicle operation data from the random access memory 53 into the nonvolatile memory 54. Thus, the transferred vehicle operation data include a number of sets of the values of the engine operating conditions D1 to D10 sampled during an interval of ten seconds before the vehicle stoppage is detected and a number of sets of the values of the engine operating conditions D1 to D10 sampled during an interval of ten seconds after the vehicle stoppage is detected. The central processing unit 51 detects an engine stoppage, for example, when ten seconds have been elapsed after the ignition switch 64 is turned off. The nonvolatile memory 54 has a predetermined number of (in the illustrated base nine) memory areas MO to M9 each of which has a predetermined number of (in the illustrated case three) memory segments SO to S2, as shown in FIG. 2, for storing the newest three sets of vehicle operation data. Each of the memory segments SO to S2 has a predetermined capacity substantially equal to that of the memory area of the random access memory 53.

Figure 3:
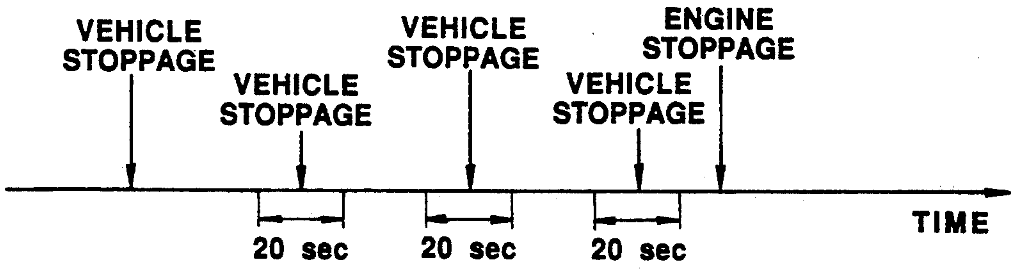
FIG. 3 is a diagram used in explaining the operation of the vehicle operation data recording apparatus of FIG. 1.

The control unit 50 includes an address counter for counting the number of times one set of the existing values of the vehicle opera ting conditions D1 and D10 are read into the random access memory 53. The count N of this address counter is stored in a memory area AN specified in the nonvolatile memory 54 for the count N, as shown in FIG. 2. The address counter is cleared to zero when it accumulates a predetermined count (in the illustrated case 2000). The count N is used to specify the memory locations at which one set of the sampled values of the engine operating conditions D1 to D10 are to be stored in the random access memory 53. The control unit 50 includes an engine stoppage counter for counting the number of times engine stoppage is detected. The count M of this engine stoppage counter is stored in a memory area AM specified in the nonvolatile memory 54 for the count M, as shown in FIG. 2. The engine stoppage counter is cleared to zero when it accumulates a predetermined count (in the illustrated case nine). The count m is used to select one of the memory areas MO to M9 of the nonvolatile memory 54. The control unit 50 also includes a vehicle stoppage counter for counting the number of times vehicle stoppage is detected. The count L of this vehicle stoppage counter is stored in a memory area AL specified in the nonvolatile memory 54 for the count M, as shown in FIG. 2. The count L is used to select one of the memory segments SO to S2 of the selected one of the memory areas MO to M9. When a predetermined time (in the illustrated case ten seconds) has elapsed after vehicle stoppage is detected, the vehicle operation data are transferred from the random access memory 53 into the selected one of the memory sections SO to S2 of the selected one of the memory areas MO to M9 of the nonvolatile memory 54. The transferred vehicle operation data includes the vehicle operating condition values read for the predetermined time (in the illustrated case ten seconds) before the vehicle stoppage is detected and the vehicle operating condition values read for the predetermined time (in the illustrated case ten seconds) after the vehicle stoppage is detected. As a result, in the illustrated case, the newest three sets of vehicle operation data are stored in the memory segments SO to S2 of each of the memory areas MO to M9 before the engine stoppage is detected, as shown in FIG. 3.

The control unit 50 can be connected to an electronic system checking unit 60 for communication with the central processing unit 51. The control unit 50 is powered through an ignition coil 64 from a vehicle battery 62. The numeral 66 designates an electric load which is connected through the ignition coil 64 to the vehicle battery 62.

Figure 4A:
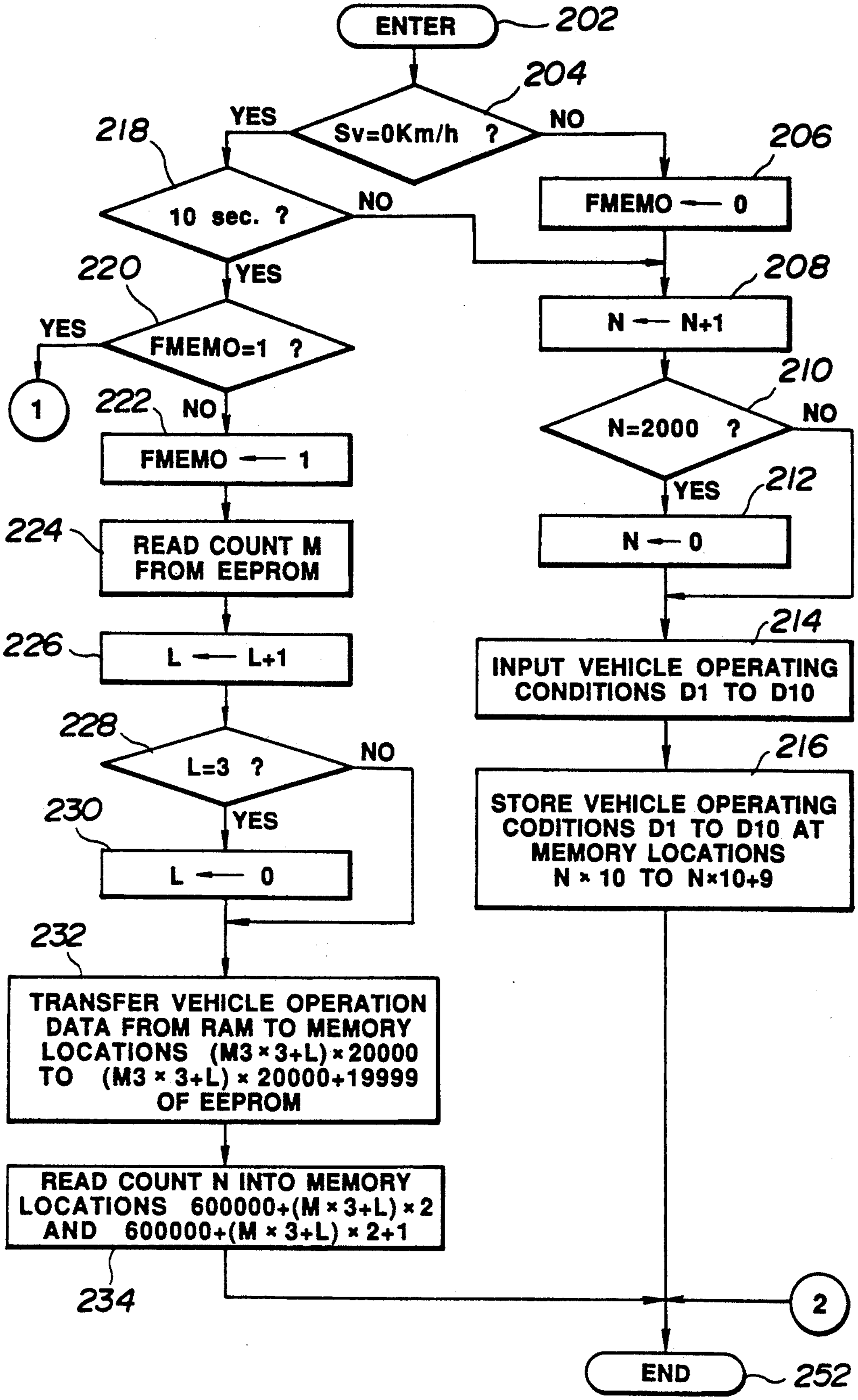
FIGS. 4A and 4B are flow diagrams illustrating the programming of the digital computer used in the vehicle operation data recording apparatus of FIG. 1.
Figure 4B:
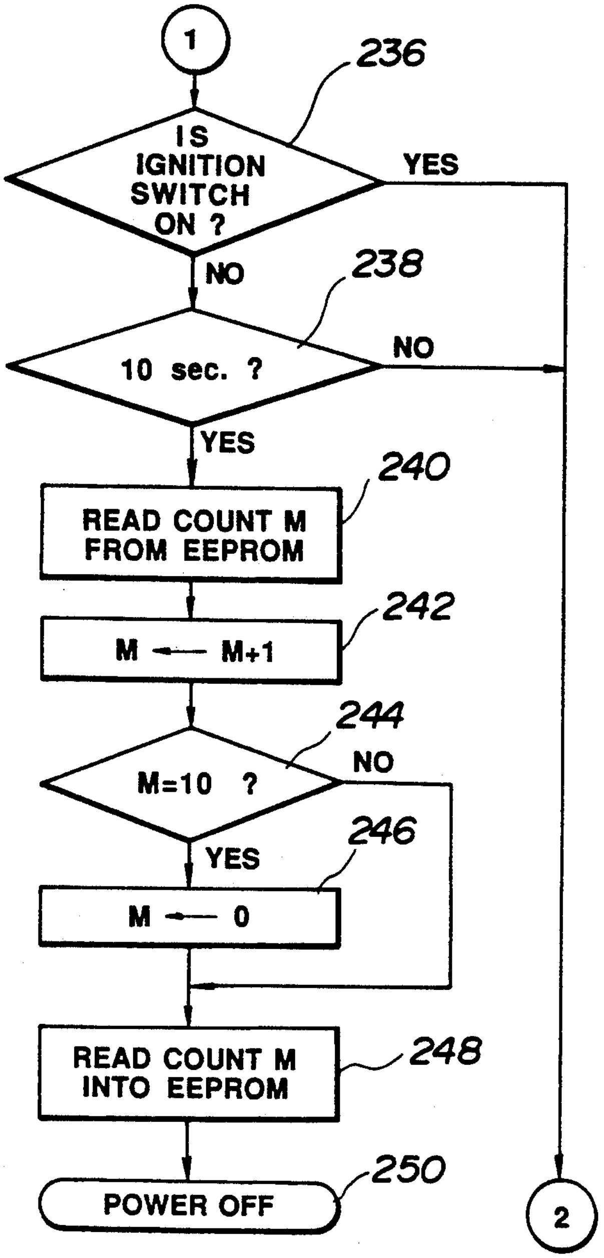

FIGS. 4A and 4B are flow diagrams illustrating the programming of the digital computer as it is used to record vehicle operation data. The computer program is entered at the point 202 at uniform intervals of 10 msec. At the point 204 in the program, a determination is made as to whether or not the vehicle speed $S_v$ is equal to 0 km/h. This determination is made based on the signal fed from the vehicle speed sensor 48. If the answer to this question is "yes", then the program proceeds to the point 218. Otherwise, the program proceeds to the point 206. At the point 206 in the program, a flag FMEMO is cleared to 0. At the point 208 in the program, the central processing unit 51 produces a command causing the address counter to increment its count Nby one step. At the point 210 in the program, a determination is made as to whether or not the count N of the address counter is equal to 2000. If the answer to this question is "yes", then the program proceeds to the point 212 where the count N is cleared to zero and then to the point 214. Otherwise, the program proceeds directly to the point 214. At the point 214 in the program, the signals indicating the existing values of the vehicle operating conditions D1 to D10 are inputted from the sensors into the computer 50. For example, the vehicle operation conditions D1 to D10 include vehicle speed, engine speed, engine coolant temperature, accelerator pedal position, etc. At the point 216 in the program, the existing values of the vehicle operating conditions D1 to D10 are read into the random access memory 53 at address locations $N \times 10$ to $N \times 10+9$ where N is the count of the address counter. Following this, the program proceeds to the end point 252. Thus, the random access memory 53 stores vehicle operation data including a number of sets of the values of the vehicle operating conditions D1 to D10 sampled, at uniform interval of ten msec., for twenty seconds.

At the point 218 in the program, a determination is made as to whether or not ten seconds have been elapsed after the vehicle speed $S_v$ decreases to 0 km/h. If the answer to this question is "yes", then the program to the point 220. Otherwise, the program proceeds to the point 208. In this case, the existing values of the vehicle operating conditions D1 to D10 are read into the computer memory 53 for an interval between the time when the vehicle speed $S_v$ decreases to 0 kmlh and the time when ten seconds has been elapsed after the vehicle speed $S_v$ decreases to 0 kmlh. As a result, the random access memory 53 stores vehicle operation data including a number of sets of the values of the vehicle operating conditions D1 to D10 sampled, at uniform interval of ten msec., for ten seconds before the vehicle speed Sv decreases to zero and a number of sets of the values of the vehicle operation conditions D1 to D10 sampled, at uniform interval of ten msec., for ten seconds after the vehicle speed $S_v$ decreases to zero.

At the point 220 in the program, a determination is made as to whether or not the flag FMEMO has been set. If the answer to this question is "yes", then the program proceeds to the point 236. Otherwise, the program proceeds to the point 222 where the flag FMEMO is set. At the point 224 in the program, the central processing unit 51 reads the count M of the engine stoppage counter included in the nonvolatile memory 54. The engine stoppage counter M counts up by one step each time the engine stoppage is detected. The count M of the engine stoppage counter is cleared to zero when its count arrives at ten. The count M of the engine stoppage counter is used to specify a higher address of the nonvolatile memory 54. At the point 226 in the program, the count L of the vehicle stoppage counter is incremented by one step. At the point 228 in the program, a determination is made as to whether or not the count L of the vehicle stoppage counter is equal to three. If the answer to this question is "yes", then the program proceeds to the point 230 where the count L of the vehicle stoppage counter is cleared to zero and then to the point 232. Otherwise, the program proceeds directly to the point 232. The count L of the vehicle stoppage counter is used to specify a lower address of the nonvolatile memory 54. At the point 232 in the program, the central processing unit 51 transfers the vehicle operation data which include a number of sets of the values of the vehicle operating conditions D1 to D10 stored, for twenty seconds, in the memory locations 0 to 19999 of the random access memory 53 into the memory locations $(M\times3+L)\times20000$ to $(M\times3+L)\times20000+19999$ of the nonvolatile memory 54. At the point 234 in the program, the count N of the address counter, which indicates the position of the newest set of the values of the vehicle operating conditions D1 to D10 stored in the random access memory 53, is stored at the memory locations $600000+(M\times3+L)\times2$ and $600000+(M\times3+L)\times2+1$ of the memory area AN (memory locations 600000 to 600059) of the nonvolatile memory 54. The newest vehicle operation data update the old vehicle operation data at the memory locations $(M\times3)\times20000$ to $(M\times3+2)\times20000+19999$ of the nonvolatile memory 54. Following this, the program proceeds to the end point 252.

At the point 236 in the program, a determination is made as to whether or not the ignition switch 64 is ON. If the answer to this question is "yes", then the program proceeds to the end point 252. Otherwise, the program proceeds to another determination step at the point 238. This determination is as to whether or not ten seconds have elapsed after the ignition switch 64 is turned OFF. If the answer to this question is "yes", then it means that an engine stoppage is detected and the program proceeds to the point 240. Otherwise, the program proceeds to the end point 252. At the point 240 in the program, the count M of the engine stoppage counter is read from the memory locations 600060 and 600061 of the nonvolatile memory 54. At the point 242 in the program, the count M of the engine stoppage counter is incremented by one step. At the point 244 in the program, a determination is made as to whether or not the count M of the engine stoppage counter is equal to ten. If the answer to this question is "yes", then the program proceeds to the point 246 where the count M of the engine stoppage counter is cleared to zero and then to the point 248. Otherwise, the program proceeds directly to the point 248. At the point 248 in the program, the new count M of the engine stoppage counter is stored at the memory locations 600060 and 60006 of the nonvolatile memory 54 to update the last count M. Following this, the program proceeds to the point 250 where the power to the control unit 50 is interrupted.

According to the invention, importance is attached to the fact that a vehicle will normally stop before its engine stops in the event of a traffic accident. Selected vehicle operating conditions are read into a random access memory having a predetermined capacity. Each time the vehicle stops before the engine stops, the vehicle operation data, which includes the values of selected vehicle operating conditions sampled at uniform intervals of time for a predetermined period of time before the vehicle stops and the values of the vehicle operating conditions sampled at uniform time intervals for the predetermined time period after the vehicle stops, are transferred from the random access memory to a nonvolatile memory. The nonvolatile memory has a predetermined number of (in the illustrated case ten) memory areas each of which has a predetermined number of (in the illustrated case three) memory segments for storing vehicle operation data transferred successively from the random access memory. The oldest set of the vehicle operation data is updated by the newest set of the vehicle operation data when the engine is restarted, the vehicle operation data are transferred from the random access memory into another memory area of the nonvolatile memory each time the vehicle stops. Thus, the nonvolatile memory will have vehicle operation data sampled around the time when a traffic accident occurs with a very high probability.

Although the vehicle stoppage is detected when the vehicle speed decreases to zero, it is to be understood that the vehicle stoppage may be detected when the engine speed is less than a predetermined value. Although the engine stop age is detected based upon the ignition switch position, it is to be understood that the engine stoppage may be detected when the engine speed is less than a predetermined value.

What is claimed is:

1. An apparatus for use with an automotive vehicle having an ignition switch and an internal combustion engine to record vehicle operation data, the apparatus comprising:

first means for producing a command signal when said vehicle stops before said engine stops; and second means responsive to the command signal for recording the vehicle operation data.

2. The vehicle operation data recording apparatus as claimed in claim 1, wherein said first means includes means for detecting ignition switch position, and means for producing the command signal when said vehicle stops before said ignition switch is turned off.

3. The vehicle operation data recording apparatus as claimed in claim 1, wherein said first means includes means for detecting vehicle speed and ignition switch position, and means for producing the command signal when the detected vehicle speed decreases to zero before said ignition switch is turned off.

4. The vehicle operation data recording apparatus as claimed in claim 1, wherein said first means includes means for detecting engine speed and ignition switch position, and means for producing the command signal when the detected engine speed is less than a predetermined value when said ignition switch is turned off.

5. The vehicle operation data recording apparatus as claimed in claim 1, wherein said first means includes means for detecting engine speed, and means for producing the command signal when the vehicle stops before the detected engine speed decreases to a predetermined value.

6. The vehicle operation data recording apparatus as claimed in claim 1, wherein said first means includes means for detecting engine speed and vehicle speed, and means for producing the command signal when the detected vehicle speed decreases to zero before the detected engine speed decreases to a predetermined value.

7. An apparatus for use with an automotive vehicle having an ignition switch and an internal combustion engine to record vehicle operation data, the apparatus comprising:

first memory means having a memory area having a predetermined capacity for storing values of at least one vehicle operating condition;

second memory means; and a control unit for reading existing values of the vehicle operating condition into said memory area of said first memory means at uniform intervals of time to produce engine operation data stored in said first memory means, said control unit including first means for producing a command signal when said vehicle stops before said engine stops, second means for transferring the vehicle operation data from said first memory means to said second memory means a predetermined time after the command signal is produced so that the transferred vehicle operation data include the vehicle operating condition values read for the predetermined time before the command signal is produced and the vehicle operating condition values read for the predetermined time after the command signal is produced.

8. The vehicle operation data recording apparatus as claimed in claim 7, wherein said second memory means is a nonvolatile memory.

9. The vehicle operation data recording apparatus as claimed in claim 7, wherein said first means includes means for detecting ignition switch position, and means for producing the command signal when said vehicle stops before said ignition switch is turned off.

10. The vehicle operation data recording apparatus as claimed in claim 7, wherein said first means includes means for detecting vehicle speed and ignition switch position, and means for producing the command signal when the detected vehicle speed decreases to zero before said ignition switch is turned off.

11. The vehicle operation data recording apparatus as claimed in claim 7, wherein said first means includes means for detecting engine speed and ignition switch position, and means for producing the command signal when the detected engine speed is less than a predetermined value when said ignition switch is turned off.

12. The vehicle operation data recording apparatus as claimed in claim 7, wherein said first means includes means for detecting engine speed, and means for producing the command signal when the vehicle stops before the detected engine speed decreases to a predetermined value.

13. The vehicle operation data recording apparatus as claimed in claim 7, wherein said first means includes means for detecting engine speed and vehicle speed, and means for producing the command signal when the detected vehicle speed decreases to zero before the detected engine speed decreases to a predetermined value.

14. An apparatus for use with an automotive vehicle having an ignition switch and an internal combustion engine to record vehicle operation data, the apparatus comprising:

first memory means having a memory area having a predetermined capacity for storing values of at least one vehicle operating condition;

second memory means having a predetermined number of memory areas each having a predetermined number of memory sections; and a control unit for reading existing values of the vehicle operating condition into said memory area of said first memory means at uniform intervals of time to produce engine operation data stored in said first memory means, said control unit including first means for producing a first command signal when said vehicle stops, second means for producing a second command signal when a predetermined time has elapsed after the first command signal is produced, third means for producing a third command signal when said engine stops, fourth means responsive to the third command signal for selecting one of said memory areas of said second memory means, fifth means responsive to the second command signal for selecting one of said memory sections of the selected one of said memory areas of said second memory means, sixth means responsive to the second command signal for transferring the vehicle operation data from said first memory means to the selected one of said memory sections of the selected one of said memory areas of said second memory means so that the transferred vehicle operation data include the vehicle operating condition values read for the predetermined time before the first command signal is produced and the vehicle operating condition values read for the predetermined time after the first command signal is produced.

15. The vehicle operation data recording apparatus as claimed in claim 14, wherein said second memory means is a nonvolatile memory.

16. The vehicle operation data recording apparatus as claimed in claim 14, wherein said first means includes means for detecting vehicle speed, and means for producing the first command signal when the detected vehicle speed decreases to zero.

17. The vehicle operation data recording apparatus as claimed in claim 14, wherein said first means includes means for detecting engine speed, and means for producing the first command signal when the detected engine speed is less than a predetermined value.

18. The vehicle operation data recording apparatus as claimed in claim 14, wherein said third means includes means for detecting ignition switch position, and means for producing the third command signal when a predetermined time has elapsed after said ignition switch is turned off.

19. The vehicle operation data recording apparatus as claimed in claim 14, wherein said third means includes means for detecting ignition switch position, and means for producing the third command signal when said ignition switch is turned off.

20. The vehicle operation data recording apparatus as claimed in claim 14, wherein said third means includes means for detecting engine speed, and means for producing the third command signal when the detected engine speed is less than a predetermined value.

* * * * *